United States Patent [19]

Hayakawa et al.

[11] Patent Number: 5,050,447
[45] Date of Patent: Sep. 24, 1991

[54] OIL RESERVOIR DEVICE FOR AN AUTOMATIC TRANSMISSION

[75] Inventors: Youichi Hayakawa, Toyoake; Ryoichi Shirai, Okazaki, both of Japan

[73] Assignee: Aisin Aw Co., Ltd., Anjo, Japan

[21] Appl. No.: 293,248

[22] Filed: Jan. 4, 1989

[30] Foreign Application Priority Data

Aug. 11, 1988 [JP] Japan .................................. 63-201402

[51] Int. Cl.$^5$ ............................................. F16H 57/02
[52] U.S. Cl. ..................................... 74/606 R; 74/467
[58] Field of Search ................. 74/606 R, 606 A, 467, 74/695, 700; 92/130 R, 85 AA

[56] References Cited

U.S. PATENT DOCUMENTS

| 4,606,243 | 8/1986 | Ashikawa et al. | 74/700 |
| 4,628,754 | 12/1986 | Ideta et al. | 74/467 |
| 4,712,442 | 12/1987 | Baika et al. | 74/467 |
| 4,719,812 | 1/1988 | Machida et al. | 74/606 R X |
| 4,738,152 | 4/1988 | Takimura et al. | 74/467 |
| 4,738,159 | 4/1988 | Kato et al. | 74/695 X |
| 4,850,832 | 7/1989 | Murota | 74/606 R X |

FOREIGN PATENT DOCUMENTS

| 411325 | 6/1934 | United Kingdom . |
| 587312 | 4/1947 | United Kingdom . |
| 590867 | 7/1947 | United Kingdom . |
| 1343584 | 1/1974 | United Kingdom . |

Primary Examiner—Vinh T. Luong
Attorney, Agent, or Firm—Kanesaka and Takeuchi

[57] ABSTRACT

In an automatic transmission mounted on a front engine and front drive vehicle, a valve body is positioned not to be obstructed by a vehicle side subframe, and lower sections of the transaxle casing, transaxle housing and rear cover form an oil reservoir space. Also, the lower part of the front differential device is isolated from the oil reservoir space by an oil reservoir plate and a side weir formed on the transaxle housing, but oil flows partly between the isolated areas. By this structure, the oil reservoir space is formed extending generally over the lower part of the integrated casing, and, in particular, is formed from the large space below the transaxle casing and the housing.

9 Claims, 8 Drawing Sheets

OIL RESERVOIR DEVICE FOR AN AUTOMATIC TRANSMISSION

BACKGROUND OF THE INVENTION

1. Field of the Invention

The present invention relates to an automatic transmission for a FF(Front Engine, Front Drive) vehicle, and, in particular, to an oil reservoir device for an automatic transmission.

2. Description of the Prior Art

Conventionally, in an automatic transmission, a valve body is positioned on a lower section of a transaxle casing, and an oil pan is positioned to cover the valve body. Oil accumulates in the oil pan which serves as an oil reservoir device.

However, in a FF vehicle, a subframe runs through the lower section of the transaxle casing for the automatic transmission, specifically, on section where the valve body and the oil pan are located. For this reason the valve body is positioned close to an upper section specifically, close to a rotational axis of the automatic transmission, to avoid obstruction by the subframe.

As a result, this space available for the oil reservoir is small. At high temperature, oil level becomes elevated, and when this level reaches the rotating member, oil starts to blow out through an oil breather plug as a result of agitation of the oil. On the other hand, if an amount of oil is reduced to prevent agitation, oil level becomes too low at reduced temperature and air-intake is produced at a pump suction. This has a detrimental effect on running performance of the vehicle.

SUMMARY OF THE INVENTION

An object of the present invention is to provide, with due consideration of the drawbacks of such conventional devices, an oil reservoir device wherein an oil reservoir space is defined by a transaxle housing, a transaxle casing, and a lower section of a rear cover.

Figure 5:
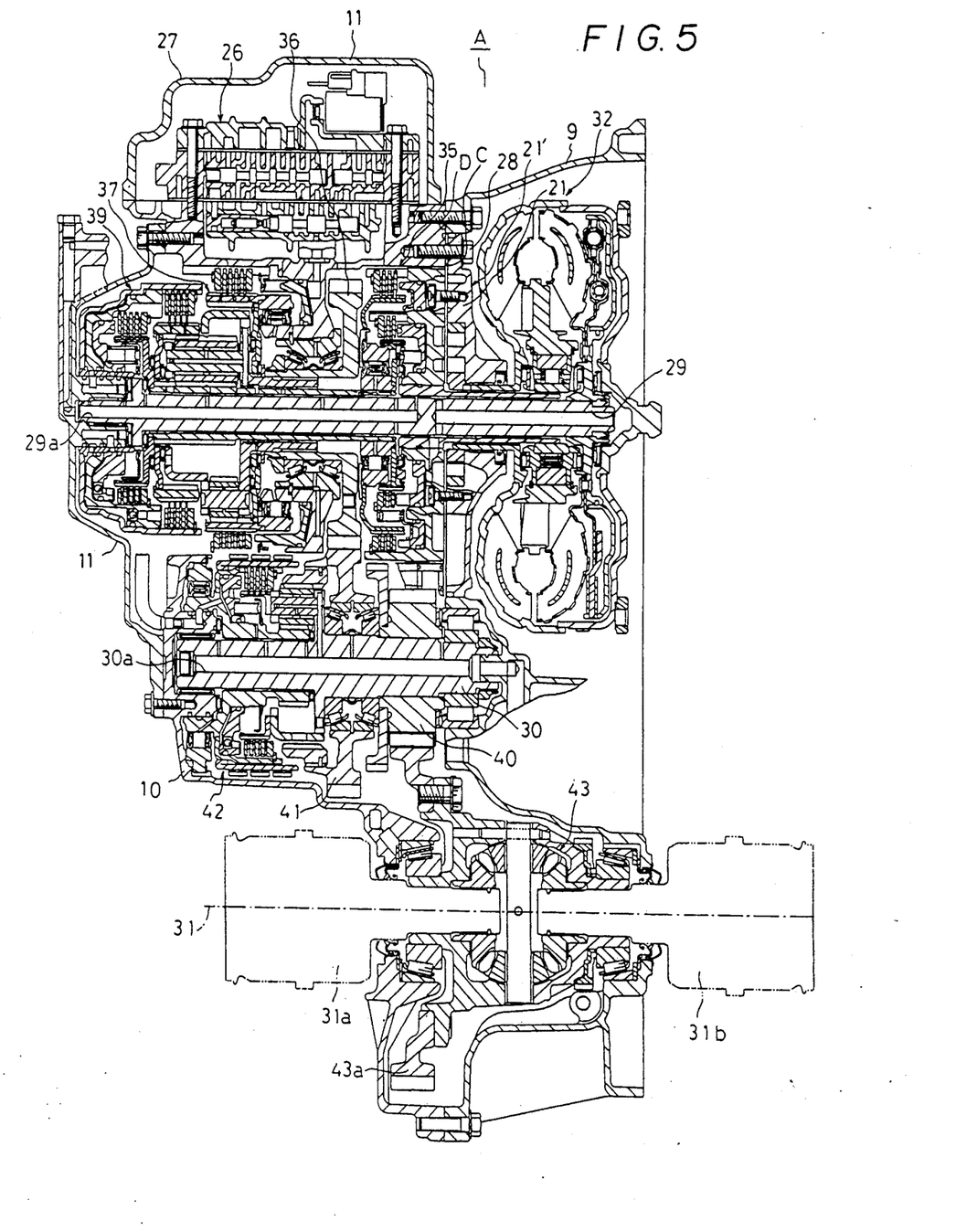
FIG. 5 is a cross sectional view taken along line 5—5 in FIG. 6 of an automatic transmission constructed in accordance with the present invention.
Figure 6:
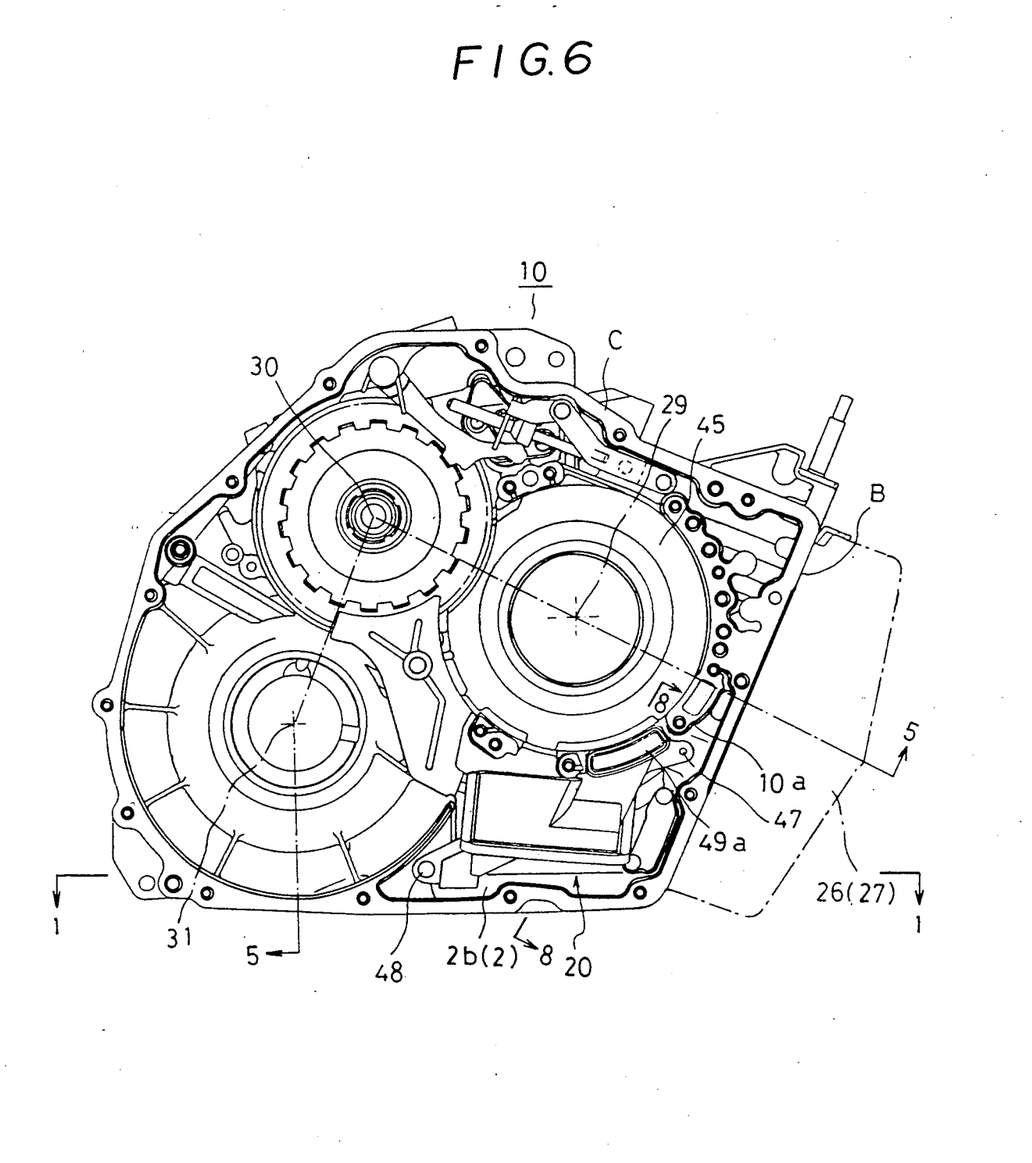
FIG. 6 is a drawing showing a front view of the transaxle casing of the automatic transmission used in the present invention.

In the present invention, as shown in FIGS. 1-5, an automatic transmission (A) having an integrated casing comprises a transaxle casing (10), a transaxle housing (9), a rear cover (11), a torque converter (32), a pair of automatic transmission mechanism sections (37), (42), and a front differential device (43) and a valve body (26) is positioned on a side surface in the lateral direction in relation to an axis of the transaxle casing (10) (as shown in FIG. 6). In addition, a front junction surface (C) of the transaxle casing (10) and a junction surface (D) of the transaxle housing (9) are joined oil-sealingly so that their lower sections are generally communicated with each other, and the lower sections of the transaxle casing (10) and the transaxle housing (9) define an oil reservoir space (2).

A rear junction surface (F) of the transaxle casing (10) and a junction surface (E) of the rear cover (11) are joined oil-sealingly so that the lower sections are generally communicated with each other, and the lower section of the rear cover section (11) also defines an oil reservoir space (2c).

In the transaxle housing (9) the lower part of the torque converter (32) and the lower part of the front differential device (43) define an oil reservoir space (2a).

The lower part of the front differential device (43) is isolated from the oil reservoir space (2) of the lower part of the transaxle casing (10) by a side weir (5) formed on an oil reserve plate (3) and the transaxle casing (10), and is utilized as the differential oil reservoir space (2d). This space (2d) and the space (2) communicate so that the oil can partly flow between them.

As a result of the above structure, the oil stored in the oil reservoir space (2) is used as lubricating oil for the automatic transmission mechanism sections (37), (42), the torque converter (32), and the front differential device (43) when the automatic transmission (A) is being driven, and is also used as operating oil for the automatic transmission mechanism sections and the torque converter through the valve body (26), which are circulated in the automatic transmission mechanism sections (37), (42). At this time, the oil reservoir space (2) is formed generally over the surface of the lower part of the integrated casing, and, in particular, the space (2) is defined by portions of the junction surface (C) and (D) of the transaxle casing (10) and the large space of the lower housing (9), which keeps adequate oil volume.

In addition, although oil in the oil reservoir space (2) is agitated as a result of rotation of the front differential device (43), flow is prevented by the oil reservoir plate (3) and the weir (5).

Incidentally the reference numerals in the parentheses are used only for reference with the drawings and do not limit the structure of the invention. The same number may be used differently in the following description and in the previous description in which the broader concept is adopted.

DETAILED DESCRIPTION OF THE PREFERRED EMBODIMENTS

The present invention will now be explained with reference to the drawings of an embodiment of the present invention.

Figure 7:
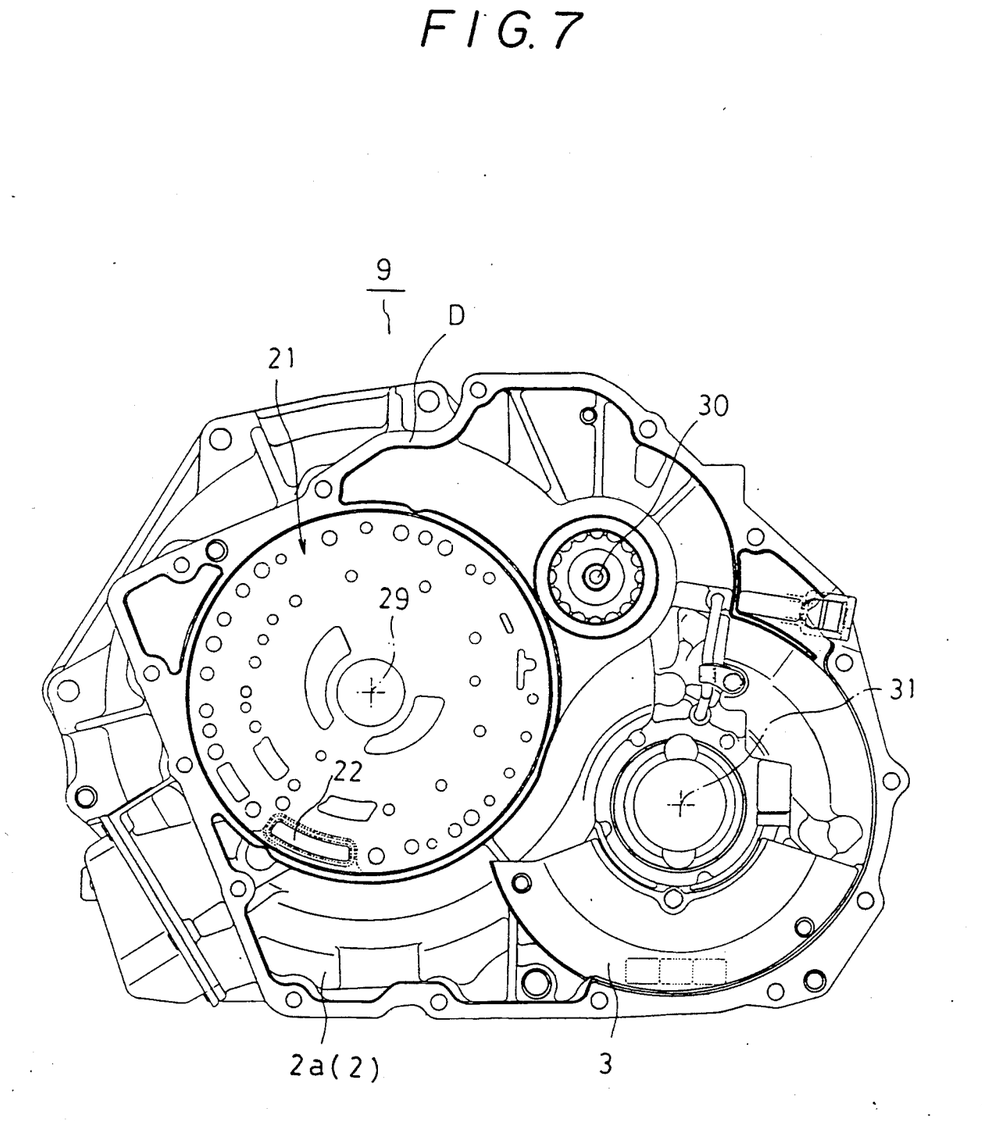
FIG. 7 is a drawing showing a rear view of the transaxle casing of the automatic transmission used in the present invention.

Now referring to FIG. 5, an automatic transmission A comprises a transaxle housing 9, a transaxle casing 10, and a transaxle cover 11. The housing 9 and the cover 11 are secured to both sides of the casing 10 respectively to form an integrated casing. Within this integrated casing a first shaft 29 is supported concentrically with an engine crankshaft. A third shaft 31 forming a front axle shaft is also supported within the integrated casing, and a second shaft 30 is situated in a manner so that these three shafts form apexes of a triangle, as shown in FIG. 6 and FIG. 7. On the first shaft 29, there are successively arranged, from an engine side, a torque converter 32, an oil pump 21', a brake section 35, a counter drive gear 36, a three-speed transmission gear section assembly 37 comprising single and dual planetary gear, and a clutch section 39. On the second shaft 30 there are arranged an output gear 40, a counterdriven gear 41, and a two-speed transmission gear section 42 which switches between directly connected rotation and reduced speed rotation. In addition, a front differential device 43 is arranged on the third shaft 31. A left front axle 31a and a right front axle 31b extend from the differential device 43.

Now referring to FIG. 5 and FIG. 6, a side surface B of the transaxle casing 10 is formed by a slanted surface facing downward, and a valve body 26 is secured together with the cover 27 by means of a bolt on the slanted side surface B.

A front surface C of the transaxle casing 10 forms a connecting surface linked to the rear surface D of the transaxle housing 9 as shown in FIG. 7. Below the valve body 26 close to the front surface C of the casing 10, specifically, below a housing section 45 for accommodating a part (a brake section 35) on the first shaft 29, a space 2b is formed. Below a portion close to the rear surface D of the housing 9 opposing the space 2b, specifically, below the oil pump 21' and the torque converter 32, a space 2a is formed. A comparatively large space 2 formed by these spaces 2a and 2b and a space 2c defined by a lower portion of the rear cover 11 becomes an oil reservoir space and a space for accomodeting the oil strainer 20 is provided adjacent to the connecting surfaces C, D of the spaces 2a and 2b.

Figure 8:
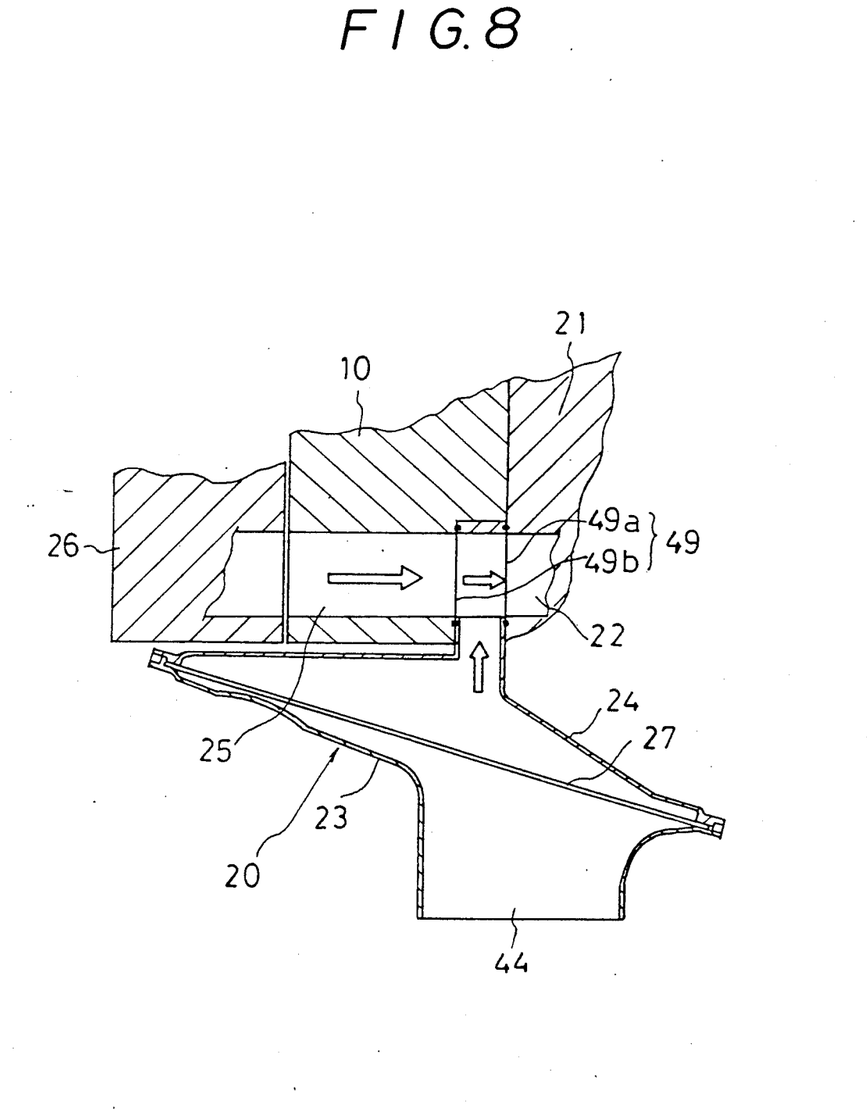
FIG. 8 is a schematic cross sectional view taken along line 8—8 in FIG. 6 for showing connections of the oil strainer of the present invention.

The oil strainer 20, as shown in FIG. 8, has a lower body 23 and an upper body 24 made of a plastic or metal material. A filter element 27 is interposed between the lower body 23 and upper body 24. The oil strainer 20 has at its lower section an intake port 44 to suck oil from the oil reservoir space 2, and at its upper section a discharge port 49 having openings 49a, 49b on both side thereof. The discharge port 49 is communicated with the suction port 22 of the oil pump 21.

An oil channel 25 is formed on a bulkhead 10a of the housing section 45 close to the front surface C of the transaxle casing 10. One end of the oil channel 25 has a barely indented portion opening with respect to the front surface C, and the other end communicates with the oil discharge port of the valve body 26. A positioning pin 47 is provided diagonally upward of the space 2b close to the front surface C of the casing 10. The pin 47 is inserted into a positioning pin hole in the oil strainer 20. A bolt hole penetrates in a portion diagonally downward of the space 2b. This bolt hole is used to secure the oil strainer 20 by using a bolt 48. In addition, the pump body 21 of the oil pump 21' is secured, as shown in FIG. 7, by means of a plurality of securing bolts 28, as shown in FIG. 5, on the front surface C of the casing 10. The suction port 22 opens into the pump body 21 to face the front surface C. Oil entering into the suction port 22 is suitably discharged by the pump 21'.

Incidentally, in FIG. 7, the joined surfaces C and D are shown in a separated state so that the rear surface D of the housing 9 is uncovered to show the suction port 22. However, in actual assembling operation, the housing 9 is secured in the casing 10 before the pump 21' and the like is assembled, so that the status in which the pump body 21 is assembled in the housing 9, as shown in FIG. 7, does not occur.

Figure 1:
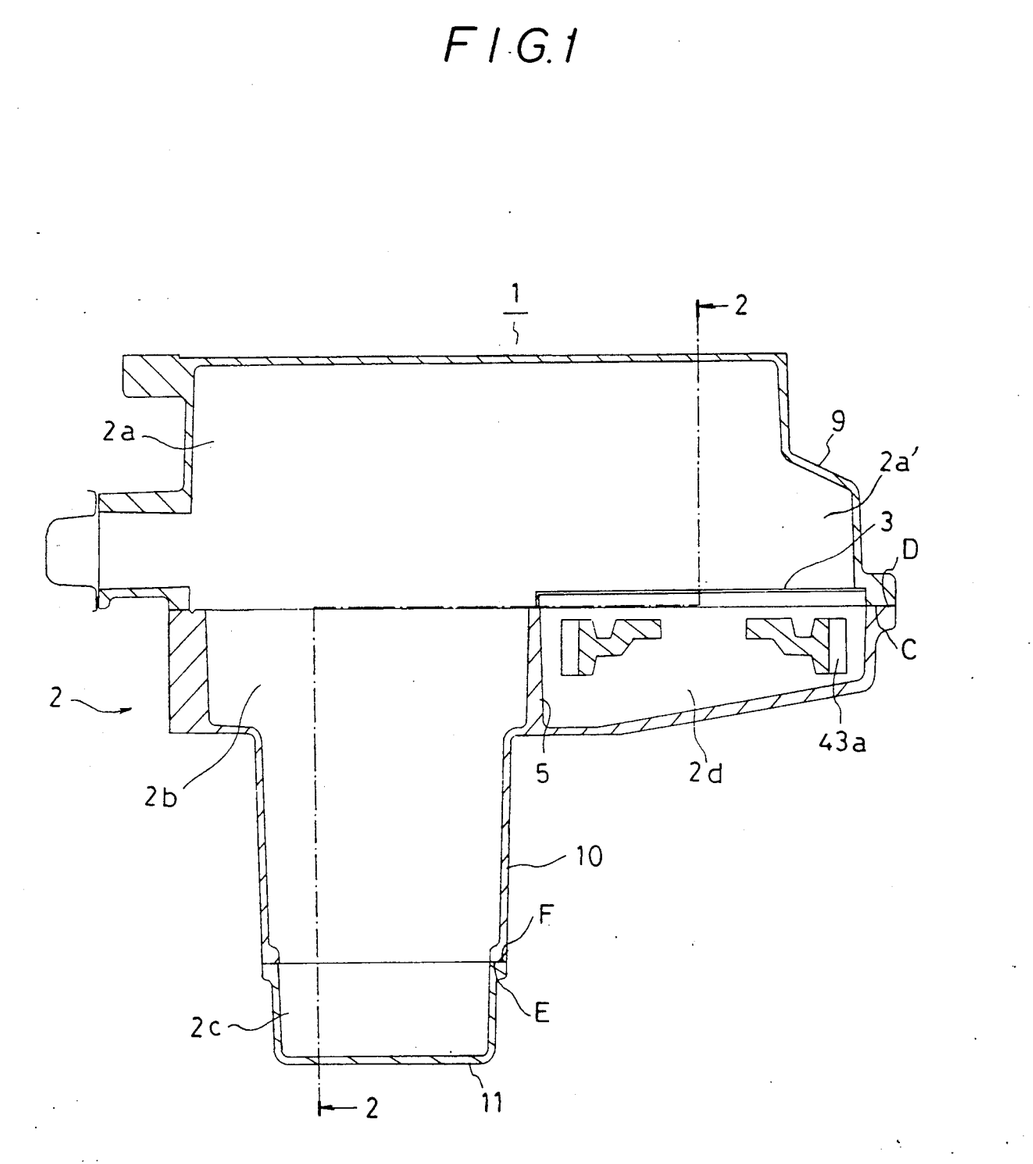
FIG. 1 is a section view taken along line 1—1 in FIG. 6 of the oil reservoir device of the present invention.
Figure 2:
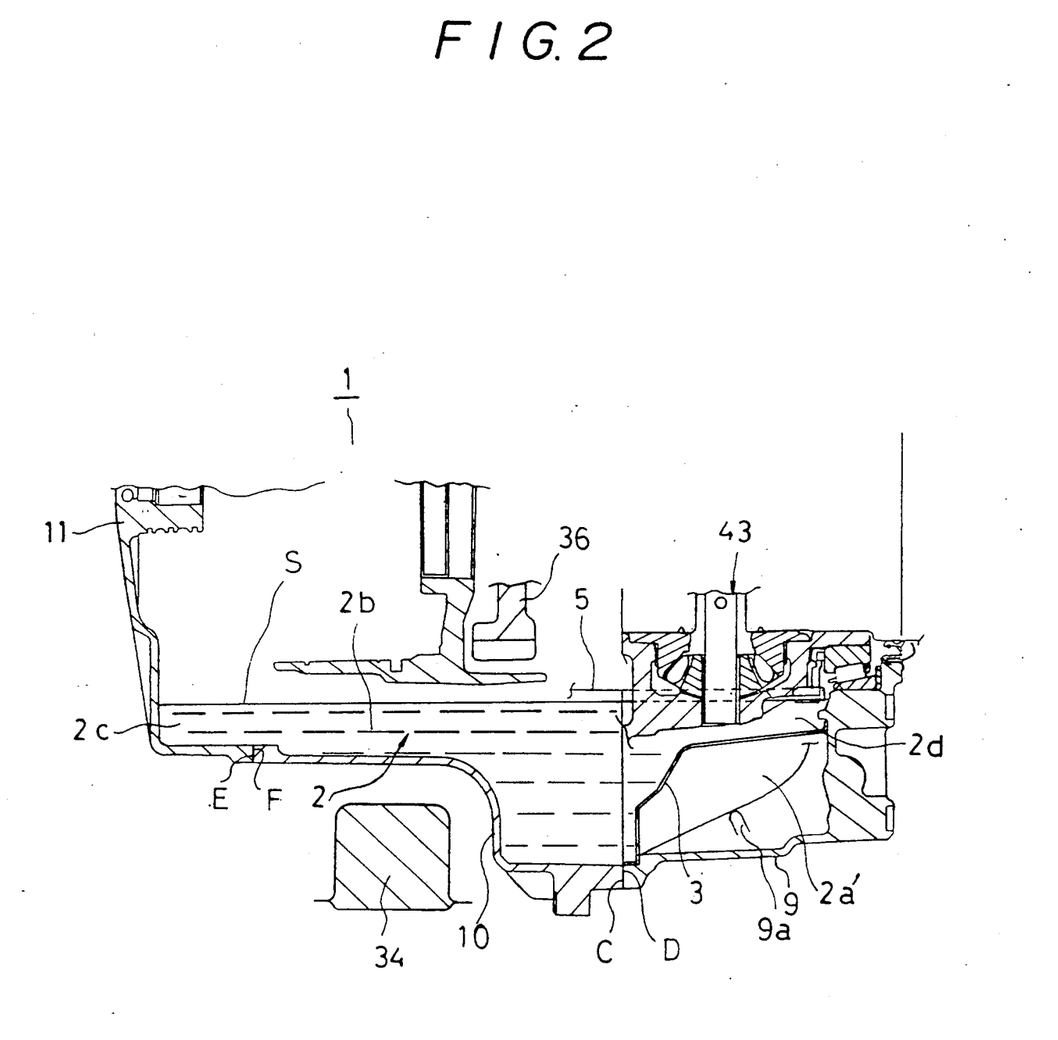
FIG. 2 is a cross-sectional view taken along the line 2—2 in FIG. 1.
Figure 3:
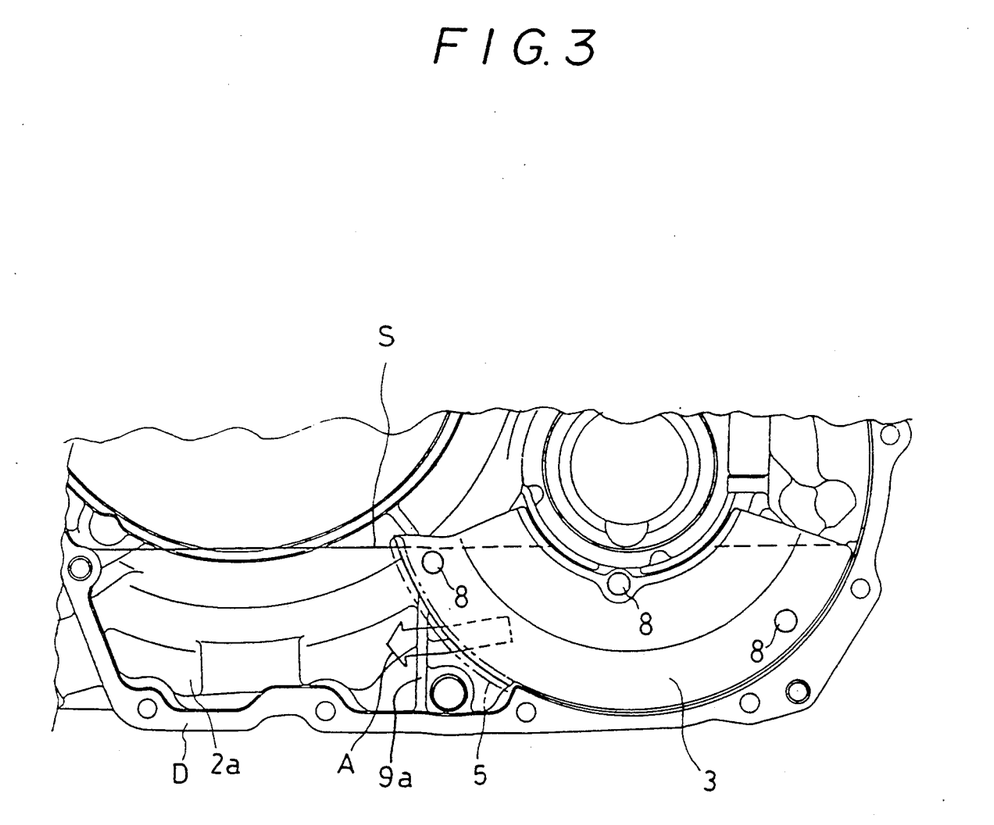
FIGS. 3 is a view showing the rear surface section of a transaxle housing.
Figure 4:
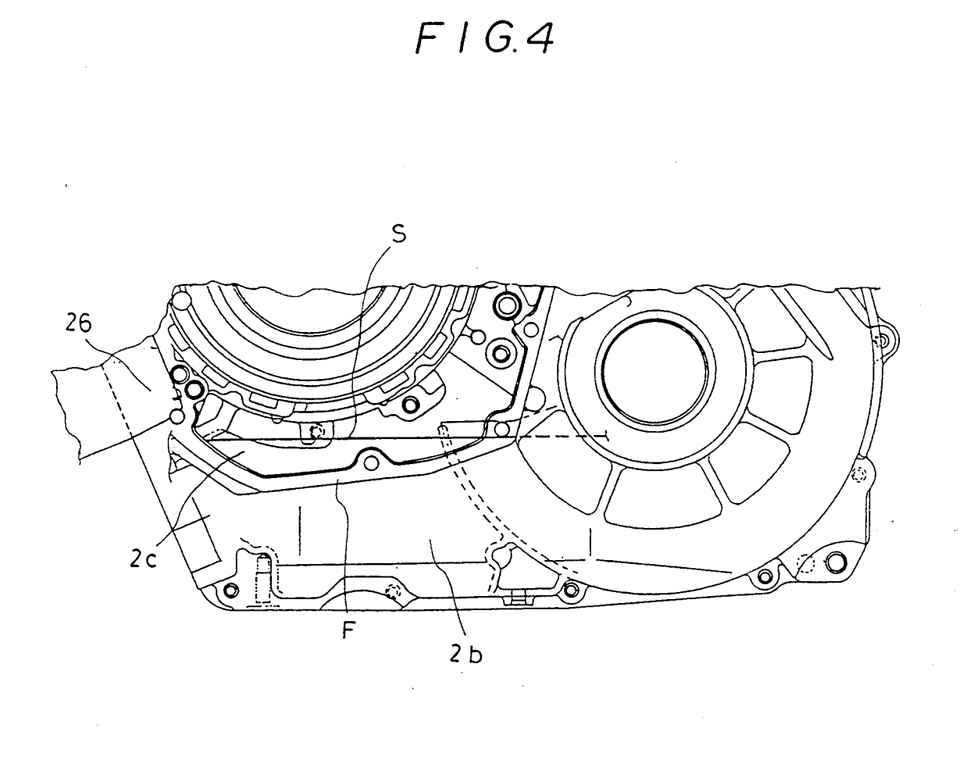
FIG. 4 is a view showing the rear surface section of a transaxle casing.

Now referring to FIG. 1, the oil reservoir device 1 shown in FIG. 1 to FIG. 4, is formed by the oil reservoir space 2, the oil reservoir plate 3 and the side weir 5. The oil reservoir space 2 is formed by the spaces 2a, 2b, and 2c formed in the lower sections of the transaxle housing 9, the transaxle casing 10 and the rear cover 11 respectively, and the oil reservoir plate 3 and the side weir 5 separate the oil reservoir space 2 from the differential device 43 and the ring gear 43a. The rear surface D of the transaxle housing 9 and the front surface C of the transaxle casing 10, along with the rear surface F of transaxle casing 10 and the front section E of the rear cover 11, are closely joined oil-sealingly through a sheet material such as a liquid gasket and the like. The side weir 5 is integrally formed on the transaxle casing 10. The side weir 5 is positioned to cover the lower part of the ring gear 43a of the front differential device 43 parallel to the axis of the transaxle casing 10. The side weir 5 is formed in the shape of an arc along an outer edge of the oil reservoir plate 3, as can be seen in FIG. 3. The oil reservoir plate 3, as shown in FIG. 3, is also seen to be formed in almost a semicircle, and is positioned to cover the lower part of the front differential device 43. In addition, the reservoir plate 3 is secured to the casing 10 and the housing 9 by the bolt 8. The oil reservoir plate 3 and the side weir 5 are contacted, and the differential device 43 and the ring gear 43a are isolated from the oil reservoir space 2. The differential oil reservoir space 2d which is isolated by the plate 3 communicates with the rear side 2a' of the section 2a where the oil strainer 20 is positioned with reference to the reservoir plate 3 in the housing 9, as shown in FIG. 3 by the arrow A. Accordingly, in the oil reservoir space 2, oil O is accumulated and maintained at a specified level S, and in the oil reservoir space 2d of the lower part of the differential device 43, which is isolated by means of the oil reservoir plate 3 and the side weir 5, oil O (FIG. 2) is also maintained at a specified oil level S. A rib 9a, shown in FIG. 2, is formed in the housing 9.

Next, operation of the present invention will be explained.

Rotation of the engine crank shaft is transmitted to the torque converter 32 of the automatic transmission A, and then to the three-speed transmission gear 37 from the first shaft 29. Next, the transmission gear section 37 is suitably shifted by suitable activation of the clutch section 39 and the brake section 35, based on oil pressure from the valve body 26. Certain rotation is transmitted to the two-speed transmission gear section 42 on the second shaft 30 through the counter drive gear 36 and the driven gear 41. The gear section 42 is also suitably shifted based on oil pressure from the valve body 26 in the same way as the gear secion 37, and the rotation is transmitted to the second shaft 30 and the output gear 40. The rotation of the output gear 40 is transmitted to the front differential device 43 through the ring gear 43a, then transmitted to left and right front wheels from the left and right front axle gears 31a, 31b forming the third shaft 31. In addition to operating oil supplied to the clutch section and the brake section, oil is supplied for lubrication to each lubrication position through a pair of oil holes 29a, 30a, and the like, in the first shaft 29 and the second shaft 30 respectively.

Drain oil from the respective hydraulic servos for the clutch section and the brake section is discharged from the valve body 26 into the oil channel 25 of the casing 10. This oil is directly sucked into the suction port 22 of the oil pump 21 through the ports 49a, 49b of the discharge section 49 of the oil strainer 20. In addition, oil used for lubrication is accumulated in the oil sump 46. Oil used as a lubricant is stored in the oil reservoier space 2.

At this time, oil which is used as operating oil and lubricating oil is stored in sufficient volume in the large oil reservoir space 2. In addition, clean oil is always supplied by the oil strainer 20. Flow of oil agitated by rotation of the front differential device 43 is prevented by the oil reservoir plate 3 and the side weir 5, and this oil does not circulate directly in the oil reservoir space 2.

In the abovementioned embodiment of the present invertion, the explanation was given to the automatic transmission A having a combination of the three-forward-speed shifting gear section 37 and the two-speed shifting gear 42 which is used for direct coupling and reduced speed switching. However, the present invention need not be limited to this structure. As revealed in Japanese Laid Open Patent No. Sho-62-93546, an automatic transmission using four forward speeds of an automatic transmission mechanism section, or other automatic transmissions can, of course, use this structure.

TECHNICAL ADVANTAGES OF THE INVENTION

As outlined in the above explanation, because the valve body (26) is positioned on the side surface (B) in the axial direction of a transaxle casing, obstruction between the vehicle side subframe (34) and the valve body (26) can be avoided, and at the same time the front junction surface (C) of the transaxle casing (10) and the junction surface (D) of the transaxle housing (9) are joined oil-sealingly so that the lower sections are generally communicated with each other, forming the oil reservoir space (2). An oil pan can therefore be eliminated, and by using a simple junction means for an oiltight junction, a specified volume of oil can be stored. In this way, blow out of oil through an oil breather plug can be prevented when oil level becomes elevated at high temperature and reaches the rotating members, and air-intake at reduced temperature if the oil level becomes too low, can be prevented.

In addition, because the rear junction surface (F) of the transaxle casing (10) and a junction surface (D) of the rear cover (11) are joined oil-sealingly so that the lower sections are generally communicated with each other, the lower sections of the casing (10) and the rear cover (9) are also effectively utilized as the oil reservoir space (2c).

Also, the lower part of the front differential device (43) is isolated from the oil reservoir space (2) of the lower part of the transaxle casing (10) by a side weir (5) and an oil reserve plate (3), and part of oil can flow between them. Accordingly, the oil which is agitated by rotation of the front differential device (43) is prevented from circulating within the oil reservoir space (2), and flotation of steel particles and the like resulting from the agitation is prevented, so that it is possible to draw clean oil through the oil strainer (20).

What is claimed is:

1. A combination of an oil reservoir device and an automatic transmission comprising:
   an integral casing formed of a transaxle casing having a front junction surface, a rear junction surface and side surfaces, a transaxle housing having a rear junction surface, and a rear cover having a front junction surface, said transaxle casing and transaxle housing having lower sections, and automatic transmission mechanisms situated inside the integral casing,
   a valve body positioned on one of the side surfaces of the transaxle casing;
   an oil reservoir space defined by the lower sections of the transaxle casing and the transaxle housing wherein the front junction surface of the transaxle casing and the rear junction surface of the transaxle housing are joined oil-sealingly so that the lower sections are generally communicated with each other;
   an oil pump for supplying oil to the automatic transmission mechanisms; and
   an oil strainer situated between the oil reservoir space and the oil pump for providing oil from the oil reservoir to the oil pump after filtration.

2. A combination of an oil reservoir device and an automatic transmission of claim 1, wherein the rear junction surface of the the transaxle casing and the front junction surface of the rear cover are joined oil-sealingly, said rear cover having a lower section so that the lower sections of the transaxle casing, transaxle housing and rear cover are generally communicated with each other, and the lower section of the rear cover is also utilized as the oil reservoir space.

3. A combination of an oil reservoir device and an automatic transmission of claim 1, wherein said automatic transmission mechanisms includes a torque converter and front differential device, spaces below the torque converter and the front differential device in the transaxle housing form a part of the oil reservoir space.

4. A combination of an oil reservoir device and an automatic transmission of claim 3, wherein the space below the front differential device is isolated from the oil reservoir space of the lower section of the transaxle casing by an oil reservoir plate and a side weir formed on the transaxle housing, and oil partly flows between said space below the front differential device and said oil reservoir space.

5. An oil reservoir device for an automatic transmission having a transmission mechanism with a front differential device, comprising,
   an integral casing formed of a transaxle casing, a transaxle housing and a rear cover, each having lower sections, respectively, said integral casing retaining the transmission mechanism therein,
   an oil reservoir space situated inside the integral casing and defined by the lower sections of the integral casing, and
   an oil reservoir plate and a side weir situated inside the oil reservoir space below the front differential device so that a part of the oil reservoir space below the front differential device is isolated from the rest of the oil reservoir space to allow oil to partly flow therebetween.

6. An oil reservoir device for lubricating oil in an automatic transmission with a torque converter, automatic transmission mechanism sections, a front differential device and a valve body, comprising:
   a transaxle casing for holding the automatic transmission mechanism sections and having a front surface, a side surface and a low section, said valve body being positioned on the side surface of the transaxle casing,
   a transaxle housing for holding the torque converter and having a rear surface and a low section, said rear surface of the transaxle housing and said front surface of the transaxle casing being joined oil-sealingly so that the low sections of the transaxle casing and transaxle housing are generally communicated with each other, said front differential device being held in the transaxle casing and transaxle housing, a rear cover joined to the transaxle casing, and an oil reservoir space formed in the low sections of the transaxle casing and transaxle housing.

7. An oil reservoir device of claim 6, wherein said transaxle casing has a rear surface, and said rear cover has a front surface and a low section, said rear surface of the transaxle casing and front surface of the rear cover being joined oil-sealing, said oil reservoir spaced being formed in the low sections of the transaxle casing, transaxle housing and rear cover.

8. An oil reservoir device of claim 6, wherein a space below the torque converter and the front differential device in the transaxle housing forms a part of the oil reservoir space.

9. An oil reservoir device of claim 6, wherein the transaxle casing includes a side weir, an oil reservoir plate being attached to the side weir so that a space below the front differential device is isolated from the oil reservoir space of the low section of the transaxle casing by the side weir and oil reservoir plate.

* * * * *